(12) United States Patent
Chen et al.

(10) Patent No.: US 7,779,977 B2
(45) Date of Patent: Aug. 24, 2010

(54) VEHICLE SHIFTING MECHANISM

(75) Inventors: Li-Yu Chen, Hsinchu (TW); Yeu-Jou Lin, Hsinchu (TW); Tien-Ho Gau, Hsinchu (TW)

(73) Assignees: Industrial Technology Research Institute, Hsinchu Hsien (TW); Kwang Yang Motor Co., Ltd., Kaohsiung (TW)

( * ) Notice: Subject to any disclaimer, the term of this patent is extended or adjusted under 35 U.S.C. 154(b) by 547 days.

(21) Appl. No.: 11/878,703

(22) Filed: Jul. 26, 2007

(65) Prior Publication Data

US 2008/0156133 A1 Jul. 3, 2008

(30) Foreign Application Priority Data

Dec. 29, 2006 (TW) .............................. 95149749 A

(51) Int. Cl.
*B60W 10/02* (2006.01)
*B60W 10/10* (2006.01)
(52) U.S. Cl. .................... 192/3.56; 74/337.5; 192/89.21
(58) Field of Classification Search ................. 192/3.56
See application file for complete search history.

(56) References Cited

U.S. PATENT DOCUMENTS

| 1,893,644 | A | * | 1/1933 | Fleischel | .................... 192/3.56 |
| 6,095,004 | A | * | 8/2000 | Ota et al. | .................... 74/337.5 |
| 6,230,862 | B1 | * | 5/2001 | Reik et al. | ................. 192/3.56 |
| 6,360,861 | B1 | * | 3/2002 | Sumi et al. | .................... 192/96 |
| 6,619,450 | B2 | * | 9/2003 | Ota et al. | .................... 192/3.56 |

* cited by examiner

*Primary Examiner*—Rodney H Bonck
(74) *Attorney, Agent, or Firm*—Rabin & Berdo, P.C.

(57) ABSTRACT

A vehicle shifting mechanism configured for actuation of a clutch and gear-shifting of a shift drum in a transmission is disclosed, which includes a camshaft linked to the shift drum; an actuating motor for driving the camshaft to allow the camshaft to make one revolution to shift the shift drum with one gear; and a cam connected to the camshaft to coaxially rotate with the camshaft and abutting against a release bearing actuating element to actuate engagement and disengagement of the clutch. The cam has a symmetrical contour such that the camshaft driven by the actuating motor is capable of making one unidirectional revolution to enable actuation of the clutch and the gear-shifting of the shift drum to occur concurrently.

13 Claims, 4 Drawing Sheets

VEHICLE SHIFTING MECHANISM

BACKGROUND OF THE INVENTION

1. Field of the Invention

The present invention relates to vehicle shifting mechanisms, and more particularly, to a vehicle shifting mechanism for actuation of a clutch and gear-shifting of a shift drum in a transmission.

2. Description of the Prior Art

As regards vehicles equipped with an automatic manual transmission (AMT) mechanism, gear-shifting takes place in a transmission while engagement and disengagement of a clutch is under the control of an automatic clutch actuator and rotation of a shift drum is under the control of an automatic gear-shifting actuator. The clutch and the shift drum are each driven by an actuator and a motor. However, the conventional AMT mechanism comprising two or more actuators and motors is disadvantaged by limited room and high costs.

To overcome the aforesaid drawbacks, transmission manufacturers put forth an AMT mechanism designed for automatic transmission vehicles (ATV) and characterized by space saving and low costs. The AMT mechanism comprises a single motor such that actuation of a clutch and gear-shifting of a shift drum in a transmission is powered by the motor operated at a forward/reverse mode. Gear-shifting takes place in the situation where the motor is linked to a shift drum by claws and resilient springs. Actuation of a clutch takes place in the situation where a rocker arm connected to the claws is linked to a cam.

Although the aforesaid single-motor solution solves the space-related and cost-related drawbacks of a conventional double-motor transmission, the single motor is required to rotate in two directions, forward rotation and reverse rotation, in order to shift one gear, thereby delaying consecutive gear-shifting.

The rocker arm is linked to the clutch cam only when spring resilience is restored by the claws. As a result, unsatisfactory linearity of the clutch actuating is inevitable. With power being transmitted via the rocker arm, accumulative precision between the motor and the cam deteriorates.

Driven by means of the claws, the shift drum cannot be driven anew unless the shift drum is reinstated by means of a spring. Hence, consecutive gear-shifting may be delayed due to slow spring resilience.

Accordingly, an issue calling for urgent solution involves overcoming the aforesaid drawbacks of the prior art.

SUMMARY OF THE INVENTION

In light of the aforesaid drawbacks of the prior art, it is a primary objective of the present invention to provide a vehicle shifting mechanism configured for actuation of a clutch and gear-shifting of a shift drum in a transmission, such that the actuation of the clutch and shift drum can be driven by means of a single motor.

Another objective of the present invention is to provide a vehicle shifting mechanism configured for actuation of a clutch and gear-shifting of a shift drum in a transmission that is capable of making one unidirectional revolution to shift one gear by a single motor.

Yet another objective of the present invention is to provide a vehicle shifting mechanism configured for actuation of a clutch and gear-shifting of a shift drum in a transmission that is capable of realizing smooth consecutive gear-shifting.

A further objective of the present invention is to provide a vehicle shifting mechanism configured for actuation of a clutch and gear-shifting of a shift drum in a transmission that is capable of precisely driving the clutch by a single motor.

In order to achieve the above and other objectives, the present invention discloses a vehicle shifting mechanism configured for actuation of a clutch and gear-shifting of a shift drum in a transmission, comprising: a camshaft linked to the shift drum; an actuating motor for driving the camshaft to make one revolution to allow the shift drum to shift one gear; and a cam connected to the camshaft to coaxially rotate with the camshaft and abutting against a release bearing actuating element to actuate engagement and disengagement of the clutch. The cam has a symmetrical contour such that the camshaft driven by the actuating motor is capable of making one unidirectional revolution to enable actuation of the clutch and the gear-shifting of the shift drum to occur concurrently.

Unlike the prior art design that has a shift drum and a clutch each driven by a motor and thereby results in limited rooms in a transmission and high costs, the present invention provides a vehicle shifting mechanism that requires a single motor capable of making one unidirectional revolution to allow actuation of a clutch and gear-shifting of the shift drum to occur concurrently.

Although a single motor for achieving gear-shifting of the shift drum and the actuation of the clutch concurrently is taught by another prior art, the conventional single motor is required to rotate in two directions, forward rotation and reverse rotation, in order to shift one gear, thereby delaying consecutive gear-shifting.

The vehicle shifting mechanism of the present invention also employs a motor that is used to drive a cam to make one unidirectional revolution so as to allow a shift drum to shift one gear and a clutch to be actuated concurrently due to a symmetrical contour of the cam. Therefore, consecutive gear-shifting does not entail changes of rotational direction of the motor as disclosed in the prior art. Accordingly, the vehicle shifting mechanism of the present invention allows consecutive gear-shifting to take place smoothly.

The prior art discloses a cam actuating a clutch by means of a rocker arm connected to claws, thereby resulting in unsatisfactory linearity and low transmission precision. The vehicle shifting mechanism of the present invention comprises an actuating motor coaxially rotating with the cam abutting against a clutch actuating element of the clutch, thereby allowing the cam actuation to have satisfactory linearity and allowing the actuating motor to control the clutch precisely.

A conventional shifting mechanism is not conducive to consecutive gear-shifting, not only because a motor is required to rotate in two directions, forward rotation and reverse rotation, in order to shift one gear, but also because rotation of a shift drum depends on resilience of a spring connected thereto, and consecutive gear-shifting is often delayed due to slow spring resilience. By contrast, as regards the vehicle shifting mechanism of the present invent, the cam driven by the actuating motor makes one revolution to allow the shift drum to shift one gear, thereby facilitating timing of gear-shifting.

Accordingly, the vehicle shifting mechanism of the present invention overcomes the aforesaid drawbacks of the prior art and thereby has high industrial applicability.

DETAILED DESCRIPTION OF THE PREFERRED EMBODIMENTS

The following specific embodiments are provided to illustrate the present invention. Persons skilled in the art can readily gain an insight into other advantages and features of the present invention based on the contents disclosed in this specification.

First Embodiment

Figure 1:
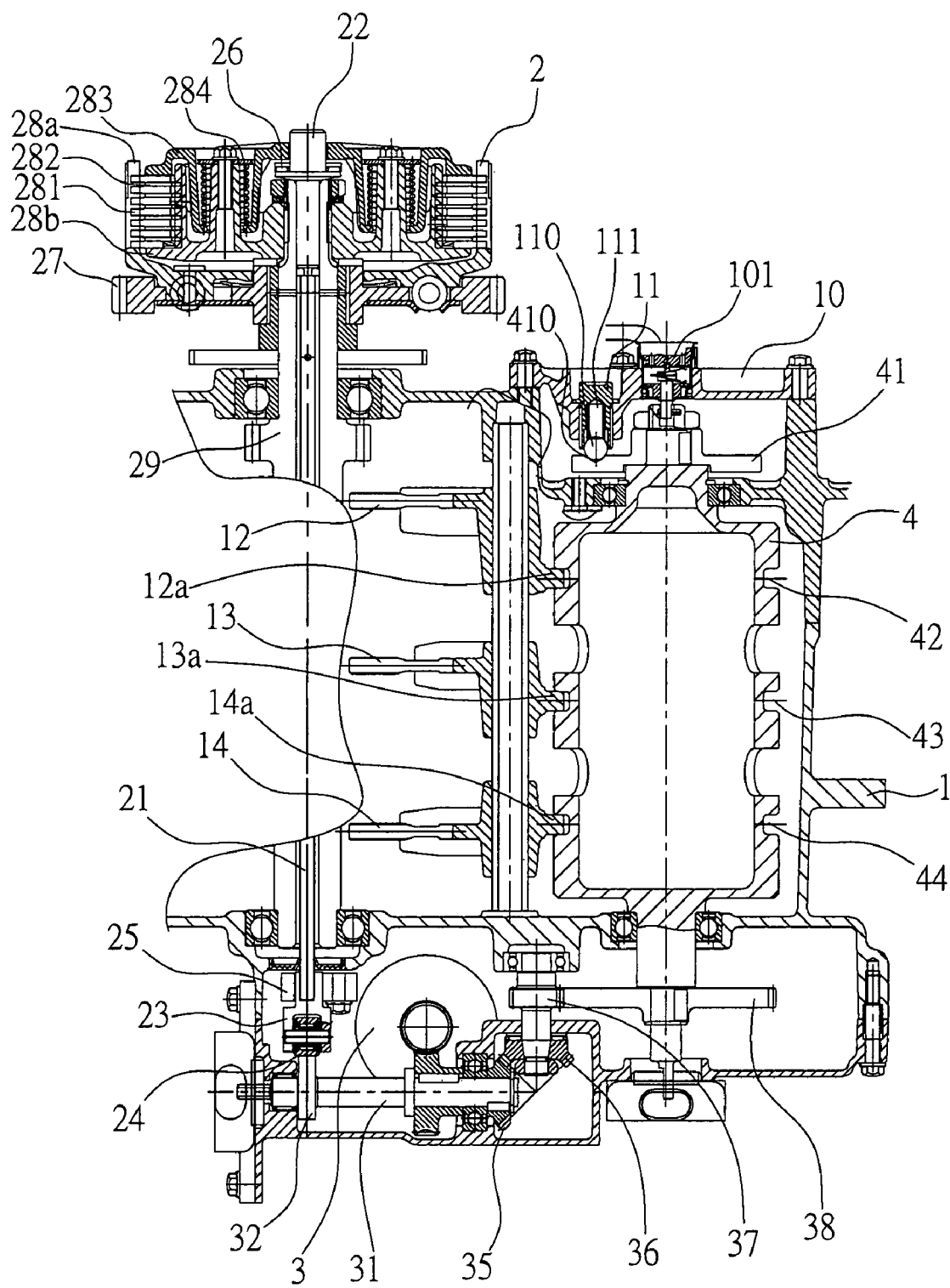
FIG. 1 is a schematic view showing the first preferred embodiment of a vehicle shifting mechanism of the present invention.

Referring to FIG. 1, which is a schematic view showing a vehicle shifting mechanism configured for actuation of a clutch 2 and gear-shifting of a shift drum in a transmission 1 in accordance with the present invention, the clutch 2 comprises a clutch actuating element 21 and a release bearing actuating element 22 for clutch-actuating the clutch 2. The vehicle shifting mechanism of the present invention comprises: a camshaft 31 linked to a shift drum 4; an actuating motor 3 linked to and driving the camshaft 31, for allowing the camshaft 31 to make one revolution to shift the shift drum 4 with one gear; and a cam 32 connected to the camshaft 31 to coaxially rotate with the camshaft 31 and abutting against the clutch actuating element 21 of the clutch 2 such that the clutch actuating element 21 abuts against the release bearing actuating element 22 disposed above the clutch actuating element 21 and abuts against a clutch release bearing 26 provided for the release bearing actuating element 22, thereby clutch-actuating the clutch 2. The cam 32 has a symmetrical contour such that the camshaft 31 driven clockwise or counter clockwise by the actuating motor 3 is capable of making one unidirectional revolution in order to enable actuation of the clutch 2 and gear-shifting of the shift drum 4 to occur concurrently.

The clutch actuating element 21 and the release bearing actuating element 22 each comprise a shaft-like body. The clutch release bearing 26 and the release bearing actuating element 22 are positioned above the clutch actuating element 21. The clutch actuating element 21 abuts against the release bearing actuating element 22 to actuate the clutch release bearing 26. The bottom of the clutch actuating element 21 is provided with an abutting base 23. The transmission 1 comprises a guiding base 25 for circumferentially enclosing the abutting base 23 so as to limit the abutting base 23 to linear reciprocal motion. The bottom of abutting base 23 is rotatably coupled to a roller 24 for rotational contact with the cam 32 to reduce resistance.

The clutch 2 can be a wet-type multi-plate frictional clutch assembly comprising a clutch driving body 28a for importing power from an engine and a clutch driven body 28b for transmitting power from the engine to the transmission 1. The clutch 2 further comprises a transmission input shaft 29 extending into the clutch 2 and transmitting power from the engine to the transmission 1. The clutch driving body 28a and a gear 27 mesh together and rotate idle around the transmission input shaft 29. The clutch driven body 28b is locked to the transmission input shaft 29. The clutch driving body 28a is provided with a brake lining 281. The clutch driven body 28b is provided with a frictional pad 282 for frictional contact with the brake lining 281. The clutch 2 further comprises a holddown spring 284 so as to allow a pressure plate 283 to be resiliently disposed above the brake lining 281 and the frictional pad 282 and linked to the release bearing actuating element 22 and clutch release bearing 26 of the clutch 2. In the situation where the clutch actuating element 21 of the clutch 2 does not push upward, the clutch 2 is engaged, that is, the holddown spring 284 resiliently presses the pressure plate 283 against the brake lining 281 to enable engagement of the brake lining 281 and the friction pad 282 of the clutch driven body 28b, and engine power is transmitted to the transmission input shaft 29 via the brake lining 281, frictional pad 282, and clutch driven body 28b. In the situation where the clutch actuating element 21 of the clutch 2 pushes upward, the release bearing actuating element 22 of the clutch 2 pushes upward, and thus the clutch release bearing 26 lifts the pressure plate 283, thereby disengaging the brake lining 281 from the frictional pad 282, and in consequence engine power is not transmitted to the transmission 1.

The camshaft 31 rotates clockwise or counter clockwise to drive a train of gears 35 and 36 and another train of gears 37 and 38 so as to transmit power to the shift drum 4 to control upshift or downshift gear-shifting performed during a gear-shifting process. The gear ratios between the camshaft 31 and shift drum 4 are set to shift the shift drum 4 with one gear per revolution of the camshaft 31.

A positioning disk 41 formed with a positioning hole 410 is disposed on top of the shift drum 4. The casing 10 of the transmission 1 is mounted with a positioning sleeve 11 provided with a positioning ball 110 and a spring 111. The positioning ball 110 can be pressed down on the positioning disk 41 resiliently by the spring 111, and locked to the positioning hole 410 as soon as the shift drum 4 revolves and reaches a point intended for gear-shifting. In so doing, positioning of the shift drum 4 is achieved easily. To perform gear-shifting, the shift drum 4 moves forks 12, 13, and 14 of the transmission 1. The shift drum 4 is circumferentially formed with cam slots 42, 43, and 44. Fork guide pins 12a, 13a, and 14a are formed at the ends of the forks 12, 13, and 14 respectively and in mesh with the cam slots 42, 43, and 44 respectively. Revolving the shift drum 4 causes the cam slots 42, 43, and 44 to move the forks axially, allowing gear-shifting to take place. Furthermore, a gear detecting element 101 is installed on top of the casing 10 of the transmission 1 to detect the current gear.

Figure 2:
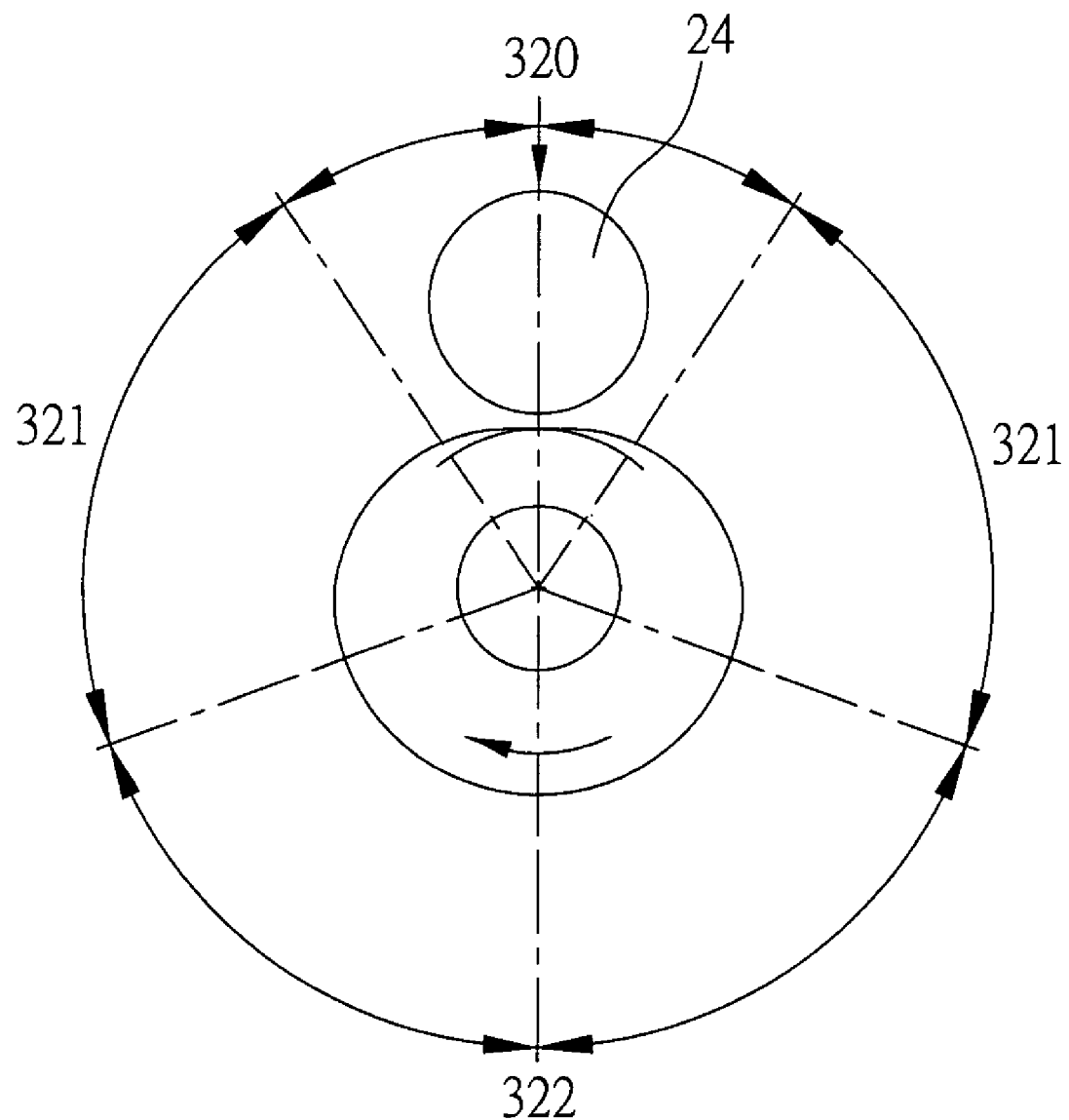
FIG. 2 is a schematic view showing a clutch-actuating cam of a vehicle shifting mechanism of the present invention.

Referring to FIG. 2, the cam 32 comprises preparatory sections 320 with a radius increasing progressively for being in contact with the clutch actuating roller 24, clutch actuating sections 321 symmetrically flanking the preparatory sections 320 and having a radius initially characterized by a constant increment and subsequently characterized by a decreasing increment, and shift drum actuating sections 322 positioned between the clutch actuating sections 321 and having a constant radius.

As regards the former one of the two preparatory sections 320, the radius of the cam 32 is too short to allow the cam 32 to come into contact with the roller 24 coupled to the bottom of the abutting base 23; as a result, with the clutch 2 engaged and the transmission 1 at idle gear or any other gear, engine power is transmitted to the transmission 1 via the clutch 2. As regards the latter one of the two preparatory sections 320, the cam 32 finally comes into contact with the abutting base 23 bottomly provided for the clutch actuating element 21. As regards the former one of the two clutch actuating sections 321, the cam 32 pushes the clutch actuating element 21 upward, releases the clutch 2, interrupts the supply of engine power to the transmission 1, thereby preparing for gear-shifting. As regards the shift drum actuating sections 322 of a constant radius, the cam 32 keeps abutting against the clutch actuating element 21 and release bearing actuating element 22 and thus the clutch 2 remains disengaged, while gear-shifting is underway in the shift drum 4. When the cam 32 rotates to reach the latter one of the two clutch actuating sections 320, a progressive decrease of the radius of the cam 32 causes the clutch actuating element 21 to descend and the clutch 2 to be engaged, and in consequence engine power is transmitted to the transmission 1 via the clutch 2 again.

The vehicle shifting mechanism of the present invention further comprises a position feedback element (not shown) configured for motor control with a view to precisely synchronizing disengagement and engagement of the clutch 2 and forward/reverse gear-shifting of the shift drum 4. The position feedback element configured for motor control is mounted on the casing 10 of the transmission 1 or disposed on the actuating motor 3.

Second Embodiment

Figure 3:
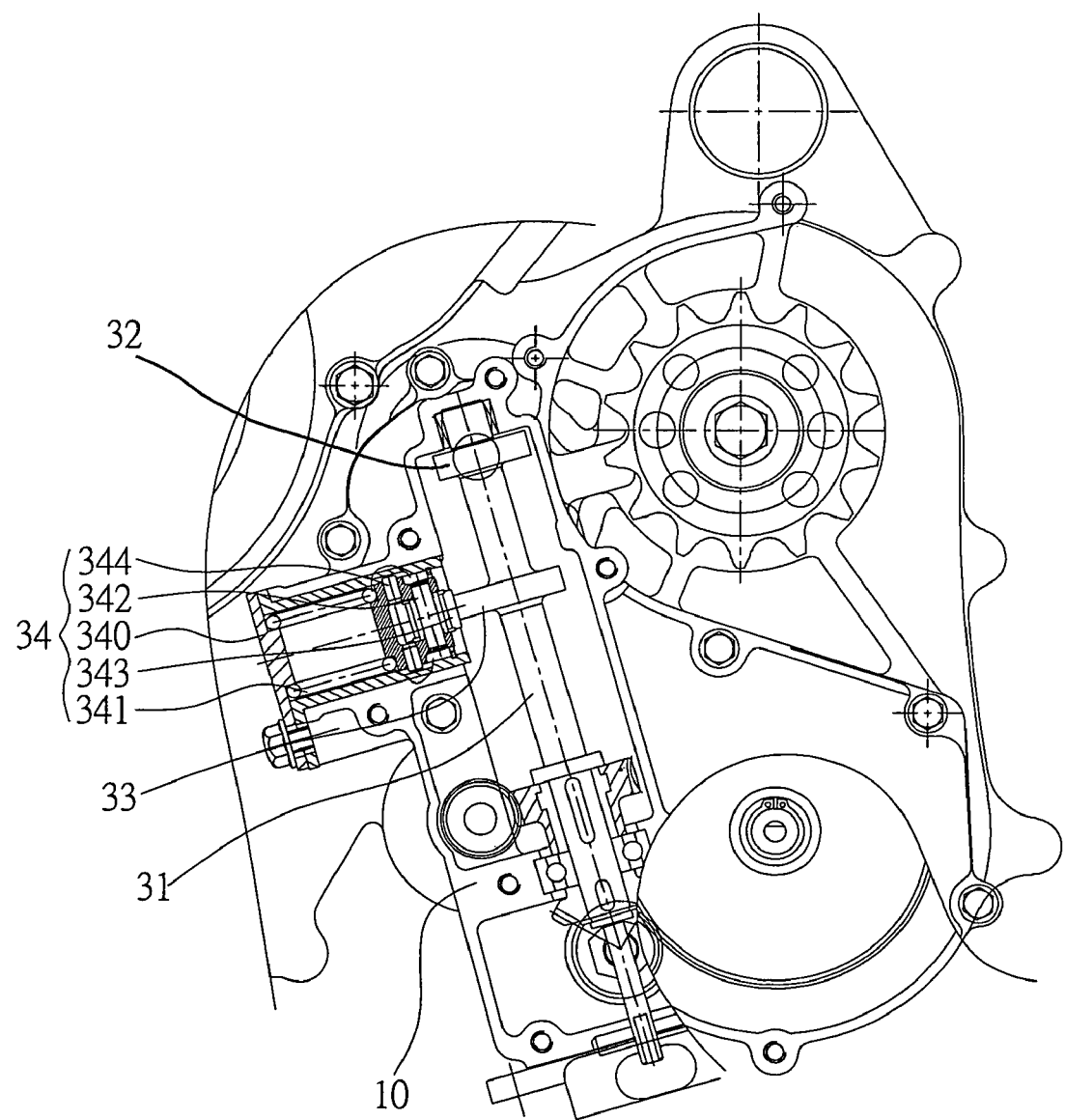
FIGS. 3 and 4 are schematic views showing the second preferred embodiment of a vehicle shifting mechanism of the present invention.

Referring to FIG. 3, the second embodiment differs from the first embodiment in the way that the camshaft 31 disclosed in the second embodiment is provided with a balancing cam 33 coaxially rotating with the cam 32, contoured to symmetrize the cam 32, and abutting against a resilient means 34 mounted on the casing 10 of the transmission 1 to obtain resilient support. The resilient means 34 comprises a spring base 340 connected to the casing 10, a spring 341 disposed in the spring base 340, a support base 342 disposed at the end of the spring 341, and a roller 343 pivotally connected to the support base 342 and configured for rotational contact with the balancing cam 33. The support base 342 is circumferentially enclosed by a guiding casing 344 so as to limit the support base 342 to linear reciprocal motion; as a result, the balancing cam 33 is resiliently supported and allowed to offset, to a great extent, a torque exerted upon the camshaft 31 by the cam 32 during the rotation of the camshaft 31, not to mention that camshaft 31 is prevented from bending which might otherwise occur due to prolonged use.

Figure 4:
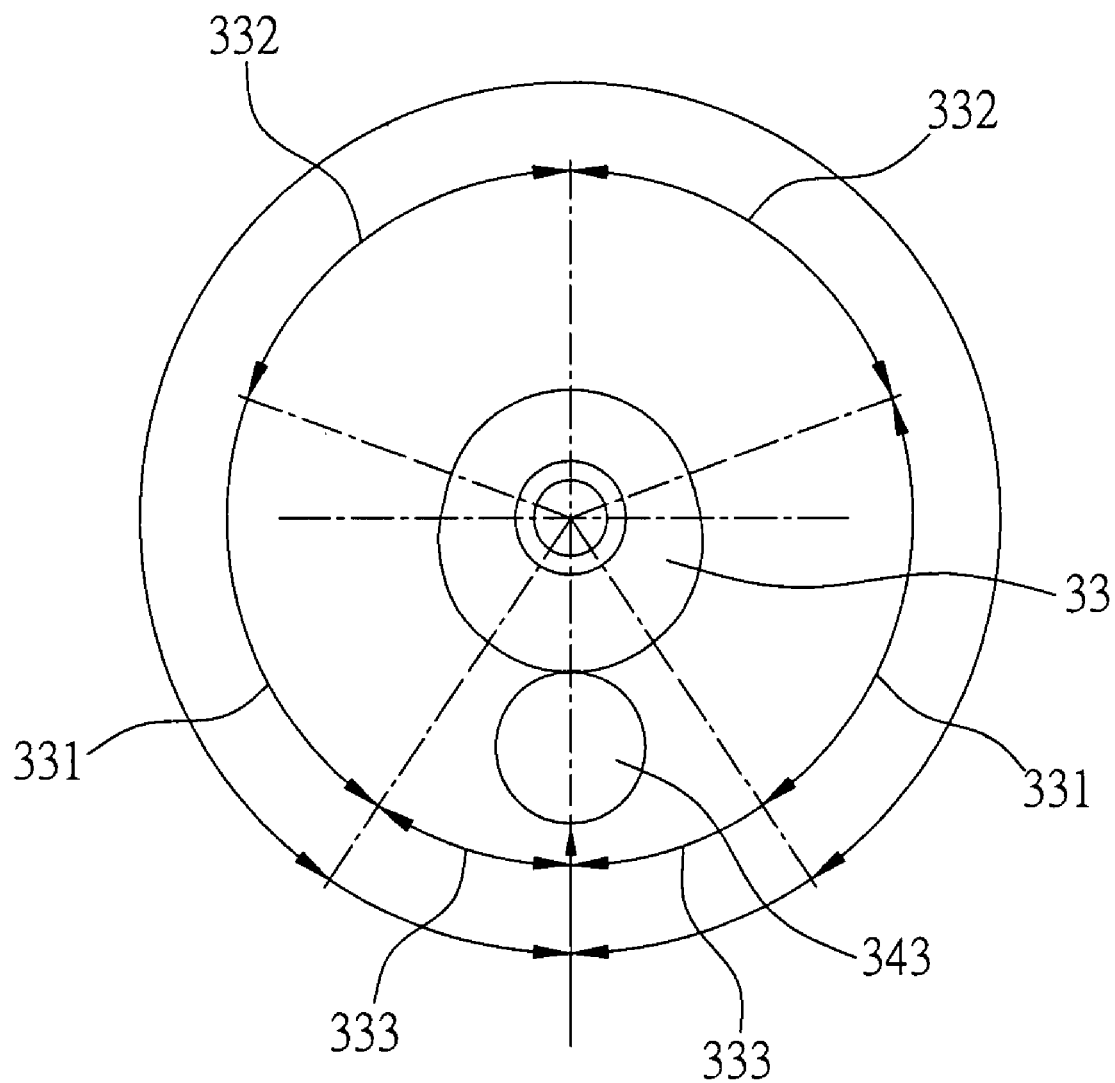

Referring to FIG. 4, the balancing cam 33 comprises clutch actuating sections 331 and shift drum actuating sections 332 for balancing clutch-actuating force by a negative lift changing in a counter direction to a cam lift of the cam 32, and preparatory sections 333 for balancing the clutch-actuating force by a negative half lift changing in the counter direction to the cam lift of the cam 32, so as to reduce the need for maximum acting force of the actuating motor 3.

The vehicle shifting mechanism of the present invention also employs a motor that is used to drive a cam to make one unidirectional revolution so as to allow a shift drum to shift one gear and a clutch to be actuated concurrently due to a symmetrical contour of the cam. Therefore, consecutive gear-shifting does not entail changes of rotational direction of the motor as disclosed in the prior art. Accordingly, the vehicle shifting mechanism of the present invention allows consecutive gear-shifting to take place smoothly.

The prior art design has a cam that actuates a clutch by means of a rocker arm connected to claws, thereby resulting in unsatisfactory clutch actuating linearity and low transmission precision. The vehicle shifting mechanism of the present invention requires an actuating motor capable of coaxial rotation in conjunction with the cam abutting against a clutch actuating element of the clutch, thereby allowing the cam to have satisfactory linearity and allowing the actuating motor to control the clutch precisely.

A conventional shifting mechanism is not conducive to consecutive gear-shifting, not only because a motor is required to rotate in two directions, forward rotation and reverse rotation, in order to shift one gear, but also because rotation of a shift drum depends on resilience of a spring connected thereto, and consecutive gear-shifting is often delayed due to slow spring resilience. By contrast, the vehicle shifting mechanism of the present invent employs a motor that is used to drive a cam to make one unidirectional revolution so as to allow the shift drum to shift one gear, thereby facilitating timing of gear-shifting.

Accordingly, the vehicle shifting mechanism of the present invention overcomes the aforesaid drawbacks of the prior art and thereby has high industrial applicability.

The aforesaid embodiments merely serve as the preferred embodiments of the present invention. The aforesaid embodiments should not be construed as to limit the scope of the present invention in any way. Hence, any other changes can actually be made in the present invention. It will be apparent to those skilled in the art that all equivalent modifications or changes made to the present invention, without departing from the spirit and the technical concepts disclosed by the present invention, should fall within the scope of the appended claims.

What is claimed is:

1. A vehicle shifting mechanism configured for actuation of a clutch and gear-shifting of a shift drum in a transmission, the clutch comprising a clutch actuating element for clutch-actuating the clutch, the vehicle shifting mechanism comprising:

a camshaft linked to the shift drum;

an actuating motor linked to and driving the camshaft, for allowing the camshaft to make one revolution to shift the shift drum with one gear; and a cam connected to the camshaft to coaxially rotate with the camshaft and abutting against the clutch actuating element of the clutch to actuate engagement and disengagement of the clutch, wherein the cam has a symmetrical contour such that the camshaft driven by the actuating motor is capable of making one unidirectional revolution in order to enable actuation of the clutch and the gear-shifting of the shift drum to occur concurrently, the cam comprising preparatory sections with a radius increasing progressively for being in contact with the clutch actuating element, clutch actuating sections symmetrically flanking the preparatory sections and having a radius initially characterized by a constant increment and subsequently characterized by a decreasing increment, and shift drum actuating sections positioned between the clutch actuating sections and having a constant radius.

2. The vehicle shifting mechanism of claim 1, wherein a bottom of the clutch actuating element is provided with an abutting base, and the transmission comprises a guiding base for circumferentially enclosing the abutting base so as to limit the abutting base to linear reciprocal motion.

3. The vehicle shifting mechanism of claim 2, wherein a bottom of the abutting base is rotatably coupled to a roller for rotational contact with the cam.

4. The vehicle shifting mechanism of claim 1, wherein the clutch comprises a clutch driving body for importing power from an engine, a clutch driven body for transmitting power to the transmission, at least a brake lining, and a pressure plate for resiliently pressing on the brake lining by a holddown spring so as to engage the clutch.

5. The vehicle shifting mechanism of claim 4, wherein the clutch further comprises a release bearing actuating element being abutted against by the clutch actuating element and a clutch release bearing provided for the release bearing actuating element, the clutch release bearing lifting the pressure plate to release the brake lining of the clutch and thereby interrupt connection between the clutch driving body and the clutch driven body.

6. The vehicle shifting mechanism of claim 1, further comprising a balancing cam connected to the camshaft, coaxially rotating with the cam, contoured to symmetrize the cam, and abutting against a resilient means mounted on a casing of the transmission to obtain resilient support.

7. The vehicle shifting mechanism of claim 6, wherein the balancing cam comprises clutch actuating sections and shift drum actuating sections for balancing clutch-actuating force by a negative cam lift changing in a counter direction to a cam lift of the cam and preparatory sections for balancing the clutch-actuating force by a negative half cam lift changing in the counter direction to the cam lift of the cam.

8. The vehicle shifting mechanism of claim 1, wherein the camshaft transmits power to the shift drum via a train of gears to shift the shift drum with one gear per revolution of the camshaft.

9. The vehicle shifting mechanism of claim 1, wherein disposed on top of the shift drum is a positioning disk formed with a positioning hole, the casing of the transmission is mounted with a positioning sleeve provided with a positioning ball and a spring, and, with the positioning ball resiliently pressed down on the positioning disk by the spring and the shift drum revolving, the positioning ball is positioned in the positioning hole.

10. The vehicle shifting mechanism of claim 1, wherein the clutch actuating element comprises a shaft-like body.

11. A vehicle shifting mechanism configured for actuation of a clutch and gear-shifting of a shift drum in a transmission, the clutch comprising a clutch actuating element for clutch-actuating the clutch, the vehicle shifting mechanism comprising:
   a camshaft linked to the shift drum;
   an actuating motor linked to and driving the camshaft, for allowing the camshaft to make one revolution to shift the shift drum with one gear;
   a cam connected to the camshaft to coaxially rotate with the camshaft and abutting against the clutch actuating element of the clutch to actuate engagement and disengagement of the clutch, wherein the cam has a symmetrical contour such that the camshaft driven by the actuating motor is capable of making one unidirectional revolution in order to enable actuation of the clutch and the gear-shifting of the shift drum to occur concurrently; and
   a positioning disk disposed on top of the shift drum and being formed with a positioning hole, a casing of the transmission being mounted with a positioning sleeve provided with a positioning ball and a spring, wherein with the positioning ball resiliently pressed down on the positioning disk by the spring and the shift drum revolving, the positioning ball is positioned in the positioning hole.

12. A vehicle shifting mechanism configured for actuation of a clutch and gear-shifting of a shift drum in a transmission, the clutch comprising a clutch actuating element for clutch-actuating the clutch, the vehicle shifting mechanism comprising:
   a camshaft linked to the shift drum;
   an actuating motor linked to and driving the camshaft, for allowing the camshaft to make one revolution to shift the shift drum with one gear; and a cam connected to the camshaft to coaxially rotate with the camshaft and abutting against the clutch actuating element of the clutch to actuate engagement and disengagement of the clutch, wherein the cam has a symmetrical contour such that the camshaft driven by the actuating motor is capable of making one unidirectional revolution in order to enable actuation of the clutch and the gear-shifting of the shift drum to occur concurrently;
   wherein a bottom of the clutch actuating element is provided with an abutting base, and the transmission comprises a guiding base for circumferentially enclosing the abutting base so as to limit the abutting base to linear reciprocal motion.

13. The vehicle shifting mechanism of claim 12, wherein a bottom of the abutting base is rotatably coupled to a roller for rotational contact with the cam.

* * * * *